United States Patent
Castañeda et al.

[11] Patent Number: 5,940,153
[45] Date of Patent: Aug. 17, 1999

[54] DISPLAY ASSEMBLY HAVING LCD AND SEAL CAPTURED BETWEEN INTERLOCKING LENS COVER AND LIGHTPIPE

[75] Inventors: Julio C. Castañeda; Thomas A. Goodwin, both of Coral Springs; Benjamin J. Hafen, Sunrise; Gregory A. Brookes, Plantation, all of Fla.

[73] Assignee: Motorola, Inc., Schaumburg, Ill.

[21] Appl. No.: 09/054,563

[22] Filed: Apr. 3, 1998

[51] Int. Cl.[6] .................... G02F 1/1333; G02F 1/1335; H05K 5/00

[52] U.S. Cl. .................. 349/58; 349/65; 361/681; 361/679

[58] Field of Search .................. 349/58, 60, 65; 361/679, 681, 814; 345/87; 200/343

[56] References Cited

U.S. PATENT DOCUMENTS

| | | | |
|---|---|---|---|
| 5,040,103 | 8/1991 | Lyons | 362/268 |
| 5,075,824 | 12/1991 | Tan | 362/31 |
| 5,134,505 | 7/1992 | Tanaka et al. | 349/58 |
| 5,265,273 | 11/1993 | Goodwin et al. | 455/347 |
| 5,358,412 | 10/1994 | Maurinus et al. | 439/66 |
| 5,375,005 | 12/1994 | Komano | 349/58 |
| 5,422,751 | 6/1995 | Lewis et al. | 359/83 |
| 5,479,285 | 12/1995 | Burke | 359/83 |
| 5,548,430 | 8/1996 | Kuo | 349/58 |
| 5,596,487 | 1/1997 | Castaneda et al. | 361/814 |
| 5,677,746 | 10/1997 | Yano | 349/58 |
| 5,694,190 | 12/1997 | Matsumoto et al. | 349/58 |
| 5,774,199 | 6/1998 | Ozawa | 349/149 |
| 5,835,139 | 11/1998 | Yun et al. | 349/58 |

*Primary Examiner*—William L. Sikes
*Assistant Examiner*—Tarifur R. Chowdhury
*Attorney, Agent, or Firm*—Andrew S. Fuller

[57] ABSTRACT

A display module (100) includes a light pipe (140), a liquid crystal display (LCD) module (130), a lens cover (110), and a gasket (120), which are mated together to form a sealed assembly. The LCD module (130) and gasket (120) are captured between the lens cover(110) and light pipe (140), such that the gasket (120) provides a seal between the lens cover (110) and the LCD module (130). Preferably, the gasket (120) has at least one integrally formed button (122) that protrudes through a buttonhole (112) on the lens cover (110) to provide for external actuation of a switch (152) within the display module assembly (100).

10 Claims, 4 Drawing Sheets

DISPLAY ASSEMBLY HAVING LCD AND SEAL CAPTURED BETWEEN INTERLOCKING LENS COVER AND LIGHTPIPE

TECHNICAL FIELD

This invention relates in general to display modules for electronic devices, and more particularly, to display module assemblies.

BACKGROUND OF THE INVENTION

Liquid crystal display (LCD) modules are often used in electronic devices for user interface purposes. A typical LCD module comprises liquid crystal material, suspended between layers of glass or other transparent medium, thin film circuitry overlaying the glass for energizing purposes, and an interface for driving the LCD module. Such LCD modules are ordinarily fragile, and much caution must be exercised when handling them in a manufacturing environment. In the manufacture of an electronic device, an LCD module is often assembled to a printed circuit board or other structural element, together with additional components to facilitate its use. In order to minimize problems, due to breakage, or due to the introduction of defects, LCD modules are usually introduced toward the end of the assembly process.

It is desirable to have a display subassembly in which an LCD module is combined with other display components to facilitate testing and handling in a manufacturing environment. Preferably, such subassembly should be of simple construction, robust, functionally testable, and not susceptible to the introduction of defects from normal handling. Prior art display subassemblies do not adequately meet the needs of simplicity, functional completeness, and robustness. Therefore, a new display assembly is needed.

DETAILED DESCRIPTION OF THE PREFERRED EMBODIMENT

Figure 1:
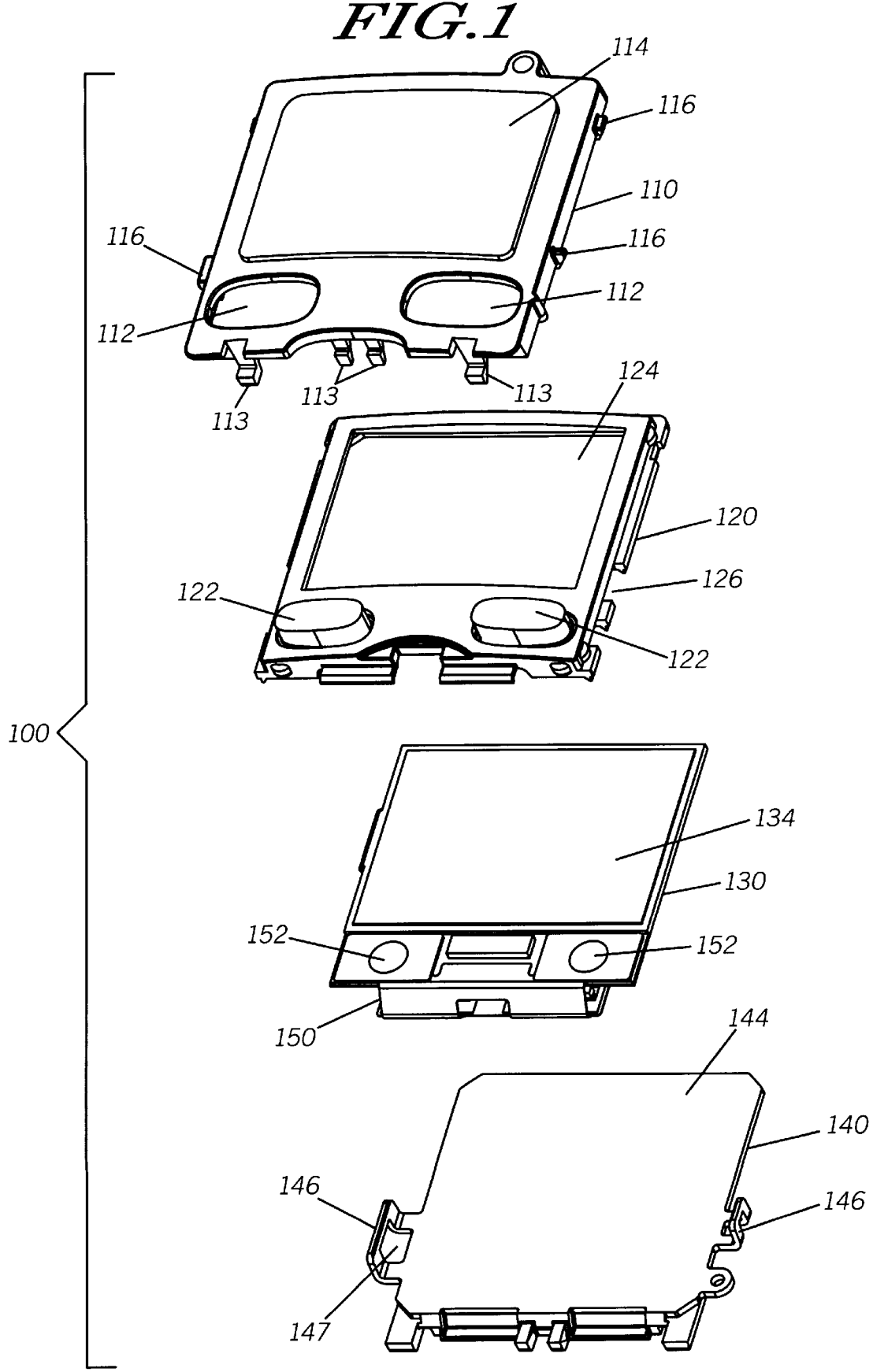
FIG. 1 is an exploded view of a display module assembly, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Generally, the present invention provides for a self-contained display module assembly for incorporation into an electronic device. The display module assembly includes a light pipe, a liquid crystal display (LCD) module, a lens cover, and a gasket, mated together in a snap-fit arrangement. The LCD module and gasket are captured between the lens cover and light pipe, such that the gasket provides a seal between the lens cover and the LCD module. Preferably, the gasket has at least one integrally formed button that protrudes through a buttonhole on the lens cover to provide for external actuation of a switch within the display module assembly.

Figure 2:
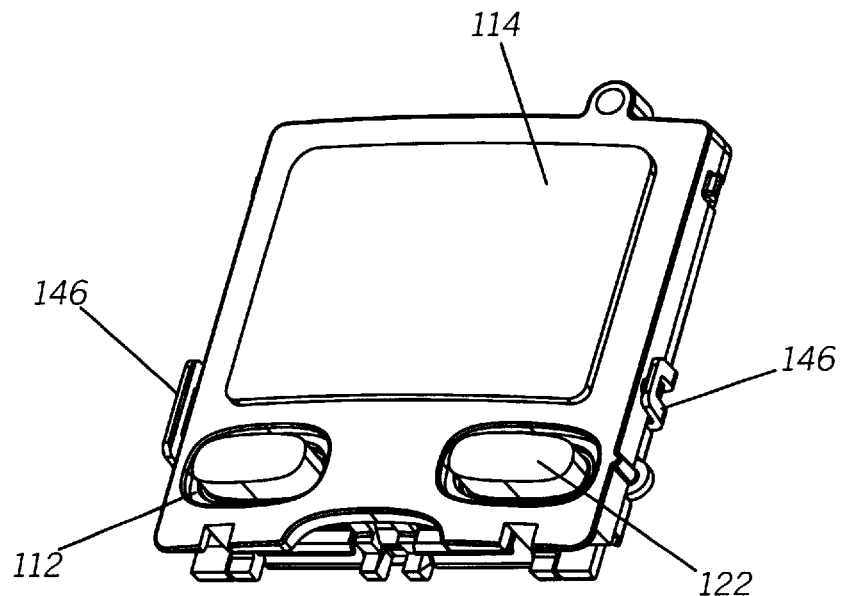
FIG. 2 is a perspective view of the display module assembly showing the front section, in accordance with the present invention.
Figure 3:
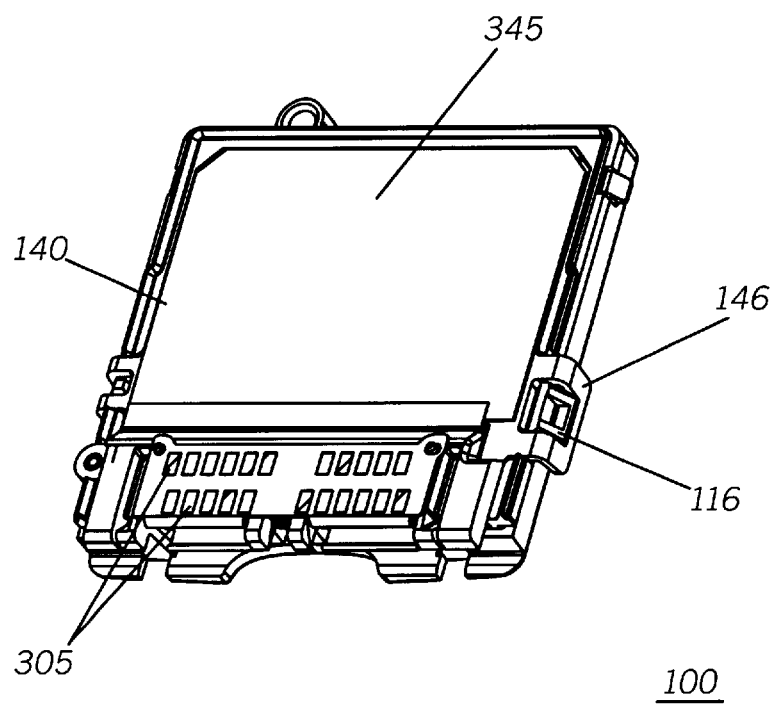
FIG. 3 is a perspective view of the display module assembly showing the rear section, in accordance with the present invention.
Figure 4:
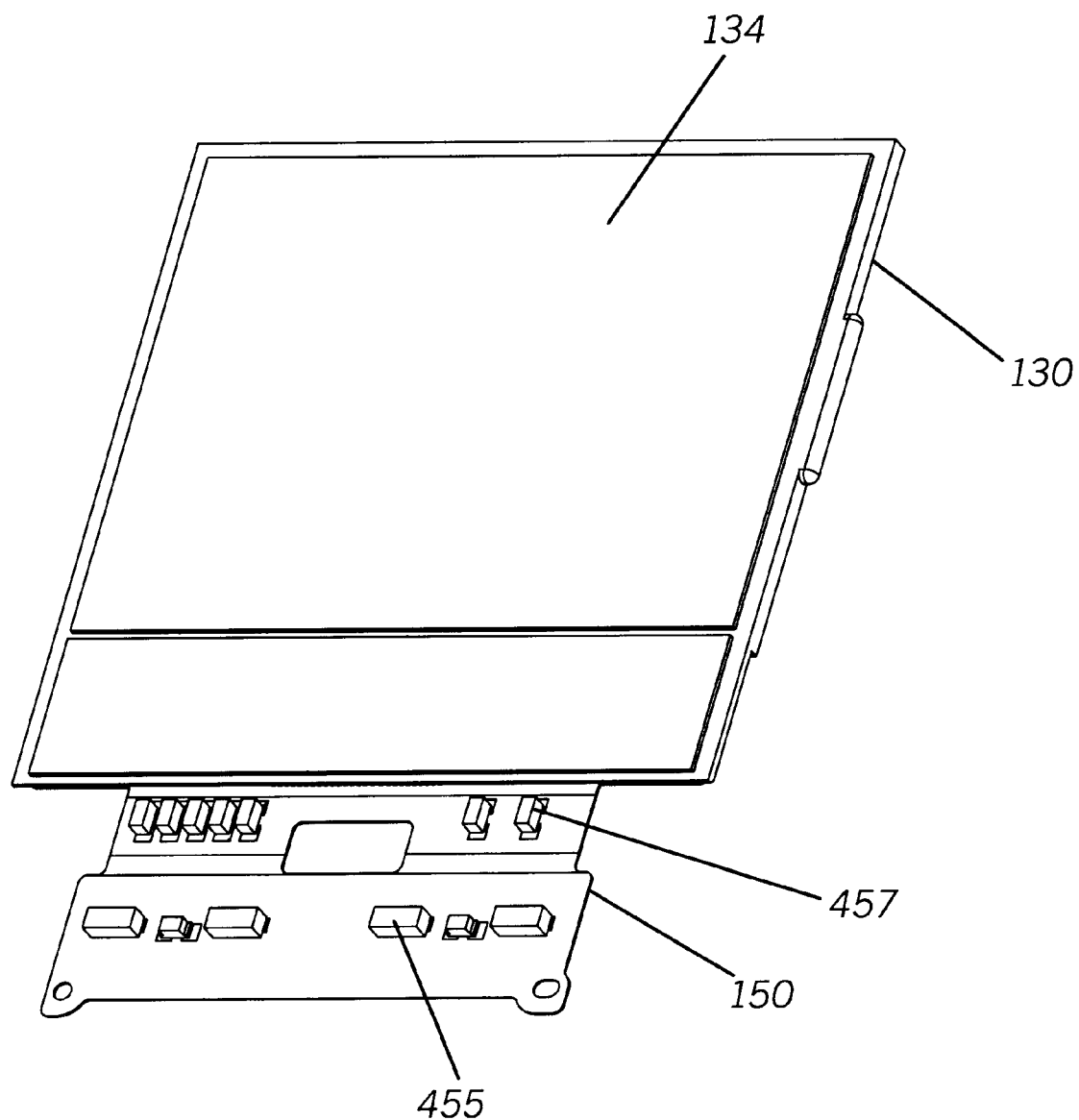
FIG. 4 is a perspective view of a liquid crystal display module having a flexible circuit substrate connector attached thereto, in accordance with the present invention.

FIG. 1 shows an exploded view of a display module assembly 100, in accordance with the present invention. FIGS. 2 and 3 show front and rear views of the display module assembly 100, respectively. FIG. 4 shows a light pipe and flex assembly used in the display module assembly 100. Referring to FIGS. 1, 2, 3 and 4, the display module assembly 100 includes a lens cover 110, a gasket 120, an LCD module 130, and a light pipe 140, which are fitted together in a self-contained functional assembly.

The LCD module 130 is an assembly comprising liquid crystal material disposed between glass layers that have an overlay of thin film circuitry (not shown) to energize the liquid crystal material for character generation display along a display surface 134. Such construction is typical in the art. A flexible substrate 150 is mechanically attached and electrically connected to the LCD module 130. The flexible circuit substrate 150 carries popple switches 152, light emitting diodes 455, driver circuitry 457 for the LCD module 130, and a set of contacts 305 that provide an electrical interface to the display module assembly 100. The popple switches 152 are positioned below the display area 134 on the LCD module 130, and the light emitting diodes 455 are positioned to function as a light source for illuminating the display area 134.

The light pipe 140 is formed from a clear, transparent material, and has a flat, rectangular shape with front and back opposing surfaces 144, 345. The back surface 345 is coated with white or light colored material to form a reflective surface. The light pipe 140 further includes retainer elements or snaps 146 projecting from the sides. Each snap 146 has a slot 147 that functions as a catch for mating with a corresponding retainer element. The light pipe 140 is capable of transmitting light generated by the light source 455 in a direction perpendicular to its front surface, and is also capable of reflecting ambient light directed at its front surface. The flexible circuit substrate 150 is also attached, or otherwise positioned with respect to the light pipe 140, such that the light emitting diodes 455 are seated within recesses (not shown) formed in the light pipe 140.

The gasket 120 is a combination seal and key pad. The gasket 120 has an opening 124 that permits viewing of the display area 134 of the LCD module 130. The gasket further includes buttons 122 that are aligned with the popple switches 152. Slots 126 on the sides of the gasket 120 provide a pass through for the snaps 146 on the light pipe. The gasket 120, including the buttons 122, is formed from resilient material in a single-piece construction. When a button 122 is depressed, it engages and actuates a corresponding popple switch 152. The resilience of the gasket material provides a return bias force, such that release of the button causes deactuation of the switch.

The lens cover 110 is preferably formed from rigid material, and has a clear, transparent portion 114 that forms a lens for viewing the display surface 134. Retainer elements in the form of hooks 116 provide a catch for the slotted snaps 146. Buttonholes 112 formed within the lens cover 110 are aligned to accommodate the buttons 122. Snap hooks 113 integrally formed on the lens cover 110 provide for snap insertion of the display module assembly 100 into a support structure of an electronic device.

When fully assembled, the flexible circuit substrate 150 is attached and electrically connected to the LCD module 130, and the popple switches 152 located on a portion of the LCD module 130 away from the display area 134. The flexible circuit substrate 150 is further wrapped around the light pipe 140 such the light emitting diodes 455 are seated in recesses within light pipe 140, and such that the set of contacts 305 on the flexible circuit substrate 150 are externally exposed and buttressed by the light pipe 140. Further, the popple switches 152 carried by the circuit substrate 150 are positioned for actuation by the buttons 122. The LCD module 130 is mounted on the light pipe 140, and the gasket 120 overlaid onto the LCD module 130. The lens cover 110 is mounted over the gasket 120 and snapped onto the light pipe 140, such that the complementary retainer elements on the light pipe 140 and lens cover 110 are engaged, and the buttons 122 protrude through the buttonholes 112. Accordingly, the LCD module 130 and gasket 120 are captured between the lens cover 110 and light pipe 140. So configured, the light pipe 140, LCD module 130, gasket 120, and lens cover 110 are fitted together in a self-contained functional module, such that the gasket 120 provides a seal between the lens cover 110 and the LCD module 130.

Figure 5:
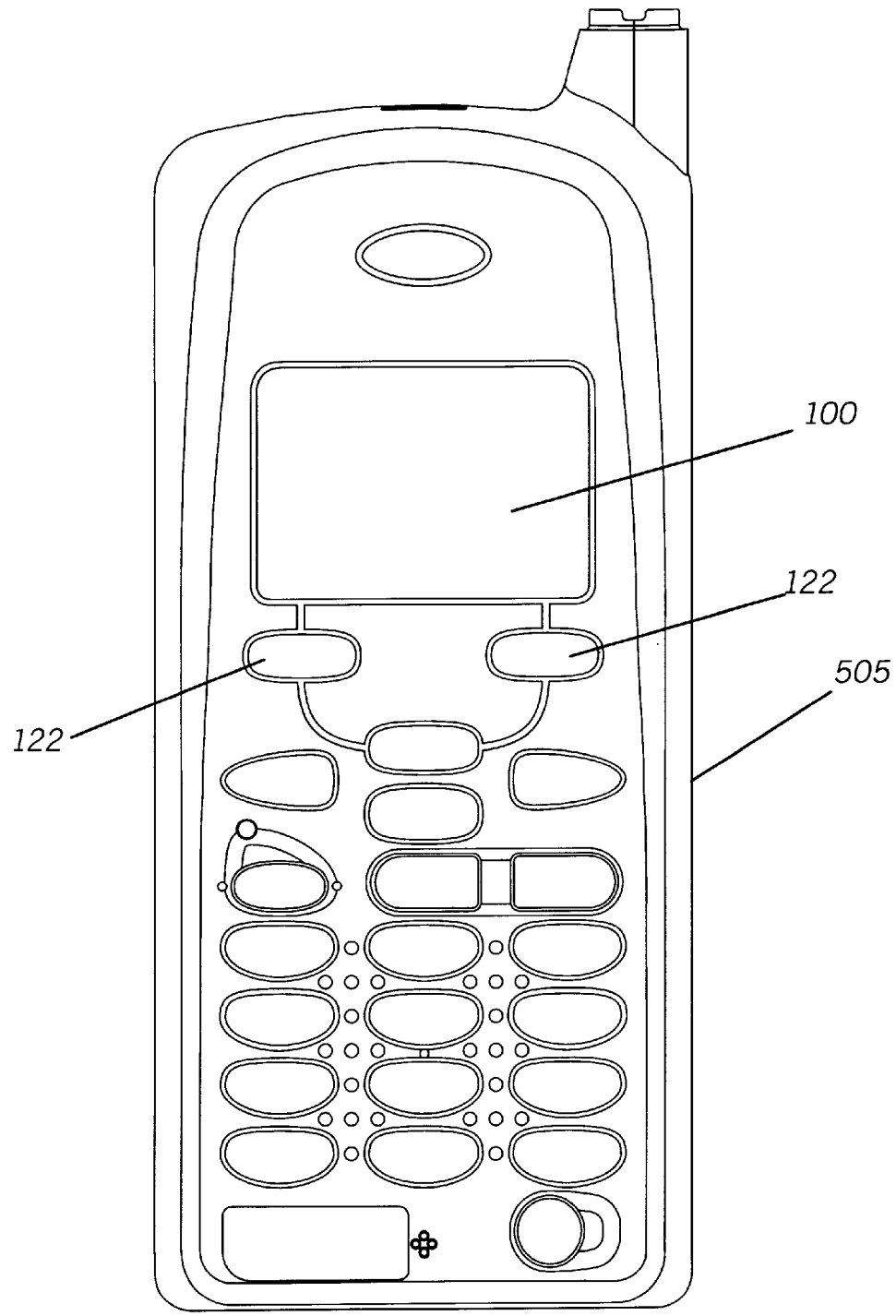
FIG. 5 is a front view of a radio incorporating the display module assembly, in accordance with the present invention.

FIG. 5 is a front view of an electronic device 500, such as a portable two-way radio telephone, that incorporates the display module assembly 100, in accordance with the present invention. The two-way radio 500 includes a radio housing 505 that houses communication circuitry for communicating over radio frequency channels, in a manner well known in the art. The display module assembly 100 is snap-fitted unto a printed circuit board or other structural support (not shown) within the radio housing 505, and connected to its internal circuitry. The integral key pad buttons 122 of the display module assembly 100 are externally exposed.

The present invention provides for significant benefits over the prior art. The display module, including LCD module, light pipe, and lens cover is assembled in a manner that protects the LCD module from damage due to mishandling. By providing for complementary retainer elements on the light pipe and on the lens cover, and by incorporating actuator buttons on a gasket that also provides a seal for the LCD module, a compact, yet highly functional display module is provided, that is robust and easily transportable. Moreover, the display module can be assembled in a clean room environment and made available as a sealed assembly component that is not susceptible to the intrusion of dust or other contaminants.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A display module, comprising:
   a light pipe;
   a liquid crystal display mounted on the light pipe;
   a gasket overlaying the liquid crystal display, the gasket having an integrated button protruding therefrom, the button and gasket having a single-piece construction; and
   a lens cover having a transparent portion and a buttonhole corresponding to the button on the gasket, the lens cover being positioned over the gasket such that the button protrudes through the buttonhole;
   wherein the light pipe, liquid crystal display, gasket, and lens cover are fitted together in a self-contained functional assembly.

2. The display module of claim 1, wherein the light pipe and lens cover have complementary retainer elements that are engaged such that the liquid crystal display and gasket are captured therebetween.

3. The display module of claim 2, wherein the retainer elements comprise a snap integrally formed on the light pipe and protruding therefrom, and a snap retainer integrally formed on the lens cover.

4. The display module of claim 1, further comprising:
   a flexible circuit substrate interconnecting the liquid crystal display and the light pipe;
   a light emitting diode carried by the flexible circuit substrate and positioned beside the light pipe; and
   a popple switch carried by the flexible circuit substrate and positioned for actuation by the button.

5. A display module, comprising:
   a light pipe having first and second surfaces that oppose each other;
   a liquid crystal display module mounted on the light pipe alongside the first surface;
   a gasket overlaying the liquid crystal display module, the gasket having an integrated button protruding therefrom, the button and gasket having a single-piece construction;
   a circuit substrate electrically interconnected to the liquid crystal display module, and comprising:
      a light emitting diode positioned beside the light pipe;
      a set of contacts positioned along the second surface of the light pipe;
      a popple switch aligned with the button; and
   a lens cover having a transparent portion and a buttonhole corresponding to the button on the gasket, the lens cover being positioned over the gasket such that the button protrudes through the buttonhole;
   wherein the light pipe and lens cover have complementary retainer elements that are engaged to secure the light pipe and lens cover together, and to capture the gasket and the liquid crystal display module, therebetween.

6. An electronic device having a self-contained display module, the display module comprising a light pipe, a liquid crystal display, a lens cover, and a gasket, wherein the light pipe and lens cover are mated together in a snap fit arrangement that captures the liquid crystal display and the gasket, such that the gasket provides a seal therebetween, wherein the lens cover has a buttonhole, and the gasket has an integrally formed button that protrudes through the buttonhole.

7. The electronic device of claim 6, further comprising:
   a flexible substrate electrically interconnected to the liquid crystal display module, and carrying circuitry comprising:
      a light source positioned beside the light pipe;
      a set of contacts buttressed by the light pipe; and
      a switch aligned with the button.

8. The electronic device of claim 7, wherein the lens cover has snap hooks protruding therefrom for securing the display module to a support structure.

9. The electronic device of claim 8, wherein the light pipe has a catch portion extending therefrom and the lens cover has a hook portion that engages the catch portion to secure the lens cover and light pipe together.

10. The electronic device of claim 9, wherein the light pipe has a back surface and a reflective backer disposed along the back surface.

* * * * *